United States Patent
Endelman et al.

(10) Patent No.: US 10,820,698 B2
(45) Date of Patent: Nov. 3, 2020

(54) CORNER MEMBER FOR A SUPPORTIVE FRAME ASSEMBLY

(71) Applicant: Balanced Body, Inc., Sacramento, CA (US)

(72) Inventors: Ken Endelman, Sacramento, CA (US); Kit W. Spelman, Sacramento, CA (US)

(73) Assignee: BALANCED BODY, INC., Sacramento, CA (US)

( * ) Notice: Subject to any disclaimer, the term of this patent is extended or adjusted under 35 U.S.C. 154(b) by 0 days.

(21) Appl. No.: 16/188,767

(22) Filed: Nov. 13, 2018

(65) Prior Publication Data
US 2019/0142159 A1     May 16, 2019

Related U.S. Application Data

(60) Provisional application No. 62/585,099, filed on Nov. 13, 2017.

(51) Int. Cl.
| | |
|---|---|
| *A47B 91/00* | (2006.01) |
| *F16B 12/30* | (2006.01) |
| *F16B 12/40* | (2006.01) |
| *A63B 22/00* | (2006.01) |
| *F16B 12/52* | (2006.01) |
| *A47B 95/04* | (2006.01) |

(Continued)

(52) U.S. Cl.
CPC .......... *A47B 91/00* (2013.01); *A63B 22/0089* (2013.01); *F16B 12/30* (2013.01);
(Continued)

(58) Field of Classification Search
CPC . A63B 22/0089; A63B 21/4029; F16B 12/40; F16B 12/30; F16B 12/14;
(Continued)

(56) References Cited

U.S. PATENT DOCUMENTS 7,802,408 B2 *  9/2010  Asbury ............... F16B 5/02
                                                    403/21
2003/0195095 A1  10/2003  Endelman et al.
(Continued)

FOREIGN PATENT DOCUMENTS

KR         20-0465564 Y1     2/2013

OTHER PUBLICATIONS

International Search Report and Written Opinion, dated Mar. 7, 2019, from corresponding International Patent App. No. PCT/US2018/060635.

*Primary Examiner* — Christopher Garft
(74) *Attorney, Agent, or Firm* — Greenberg Traurig, LLP (57) ABSTRACT

A frame corner member includes an elongated hollow extrusion having a central corner portion and two leg portions extending from the central portion. Each leg portion includes an inner side wall spaced from and parallel to an outer side wall, and merging with the central portion. An outer end wall joins the inner and outer side walls, which each include an inner surface facing the inner surface of the other side wall. An opening through the outer end wall defines a space between the inner and outer side walls adjacent one end of the extrusion for receiving one end of one of frame side members and end members. At least one of the inner surfaces in the space has discrete surface features adapted to grip and retain the one end of one of the side members and end members in the space when received through the opening.

14 Claims, 6 Drawing Sheets

(51) Int. Cl.
*F16B 12/14* (2006.01)
*A63B 21/00* (2006.01)

(52) U.S. Cl.
CPC .............. *F16B 12/40* (2013.01); *F16B 12/52* (2013.01); *A47B 95/043* (2013.01); *A63B 21/00065* (2013.01); *A63B 21/4029* (2015.10); *F16B 12/14* (2013.01)

(58) Field of Classification Search
CPC .... F16B 12/44; F16B 2012/443; F16B 12/46; F16B 12/48; F16B 12/50; F16B 12/52; F16B 12/54; F16B 12/60; F16B 12/28; F16B 2012/145; A47B 91/00; A47B 95/043

USPC .............................................. 248/188.8, 188
See application file for complete search history.

(56) References Cited

U.S. PATENT DOCUMENTS

| | | |
|---|---|---|
| 2005/0138729 A1 | 6/2005 | Harrow |
| 2013/0017935 A1* | 1/2013 | Endelman ............ A63B 21/156 482/131 |
| 2015/0043968 A1* | 2/2015 | Broughton ............. F16B 12/44 403/376 |
| 2017/0209784 A1* | 7/2017 | Pavey .................... A63B 67/04 |

* cited by examiner

FIG.6

CORNER MEMBER FOR A SUPPORTIVE FRAME ASSEMBLY

CROSS REFERENCE TO RELATED APPLICATIONS

This application claims the benefit of priority of U.S. Provisional Patent Application Ser. No. 62/585,099, filed Nov. 13, 2017, the content of which is incorporated herein by reference in its entirety.

BACKGROUND OF THE DISCLOSURE

Field of the Disclosure

The present disclosure relates to structurally supportive frames. In particular, it relates to corner members for a physical exercise apparatus frame such as a reformer.

State of the Art

Exercise machines such as reformers utilized in the performance of physical exercises originated by Joseph Pilates include supportive frames. The frames typically include side members and end members coupled together to form a rectangular frame to support and elevate the remainder of the reformer above a surface such as a floor.

Figure 1:
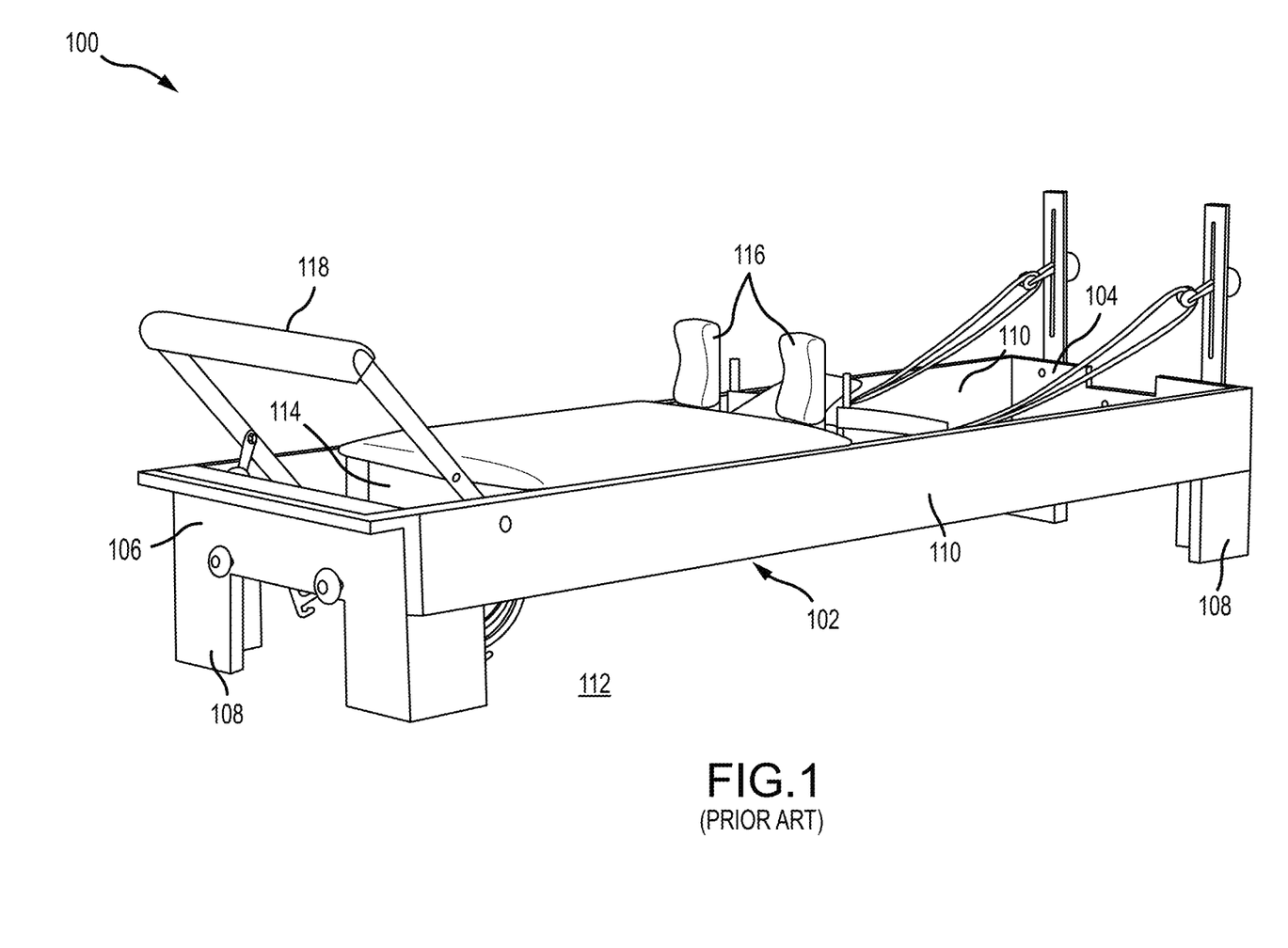
FIG. 1 is a perspective view of a conventional reformer exercise apparatus.

FIG. 1 is a perspective view of a known reformer exercise apparatus 100. The reformer exercise apparatus 100 includes a rectangular frame 102 that provides structural support for various other constituent parts of the reformer exercise apparatus 100 (also referred to herein simply as a "reformer"). The frame 102 includes a head end member 104 positioned at one end of the reformer 100. The frame 102 also includes a foot end member 106 positioned at an end of the reformer 100 that is opposite the head end member 104. The head 104 and foot 106 end members of the frame 102 join two parallel side members 110 and typically form a leg 108 at each corner.

The reformer 100 also includes a carriage 114. The carriage 114 is positioned between the side members 110 of the frame 102 for movement between the head 104 and foot 106 end members of the frame 102 on tracks carried by and between the side members 110. The carriage 114 includes shoulder stops 116 and the carriage 114 accommodates the weight of a user of the reformer 100. For example, the user of the reformer 100 may lie upon the carriage 114 with his or her feet positioned against a foot bar 118 near the foot end member 106 and his or her head positioned between the shoulder stops 116 and oriented toward the head end member 104. Through an alternating pushing force exerted upon the foot bar 118, the carriage 114 may be alternately moved toward and away from the foot end member 106.

The corners of the frame 102 require relatively expensive wood joinery techniques to form solid and strong joints such that the frame 102 remains rigid and square at all times. Such techniques are generally labor intensive and expensive to implement. Therefore, a more cost effective approach to construction of a reformer frame corner structure is needed.

SUMMARY OF THE DISCLOSURE

An exemplary corner member for use in forming a frame of a reformer in accordance with the present disclosure includes an elongated hollow, tubular metal or rigid plastic extrusion having a central axis and an L shaped transverse cross section. This extrusion has a central corner portion and two leg portions extending from the central portion forming a right angle with respect to the central corner portion. The extrusion is preferably formed from a metal such as aluminum or an alloy of aluminum, although a plastic extrusion could also be used if such a plastic has sufficient rigidity characteristics.

Each leg portion includes an inner side wall spaced from an outer side wall parallel to the inner side wall. The inner side wall and the outer side wall merge with the central portion, and an outer end wall joins the inner and outer side walls of each leg portion. The inner and outer side walls each have an inner surface facing the inner surface of the other side wall, and the outer end wall includes an opening therethrough defining a space between the inner and outer side walls adjacent one end of the extrusion for receiving one end of one of the frame side members and frame end members.

At least one and preferably both of the inner surfaces of the side walls of the corner member has discrete surface features in the defined space adapted to grip and retain one end of one of the side members or end members in the space when received through the opening.

At least one and preferably both of the two leg portions of the corner member has at least one pair of holes defined through the inner and outer side walls spaced from the opening and passing through the discrete surface features. The holes receive a fastener therethrough to fasten the one end of one of the side members or end members in the space within the corner member. The surface features preferably include a plurality of ribs extending along the surface of the leg portion across the opening.

BRIEF DESCRIPTION OF THE DRAWINGS

The disclosure will be better understood and objects, other than those set forth above, will become apparent when consideration is given to the following detailed description. Such description makes reference to the accompanying drawings wherein.

DETAILED DESCRIPTION

In the following description, numerous specific details are set forth in order to provide a more thorough disclosure. It will be apparent, however, to one skilled in the art that the art disclosed may be practiced without these specific details. In some instances, well-known features may have not been described in detail so as not to obscure the art disclosed.

Figure 2:
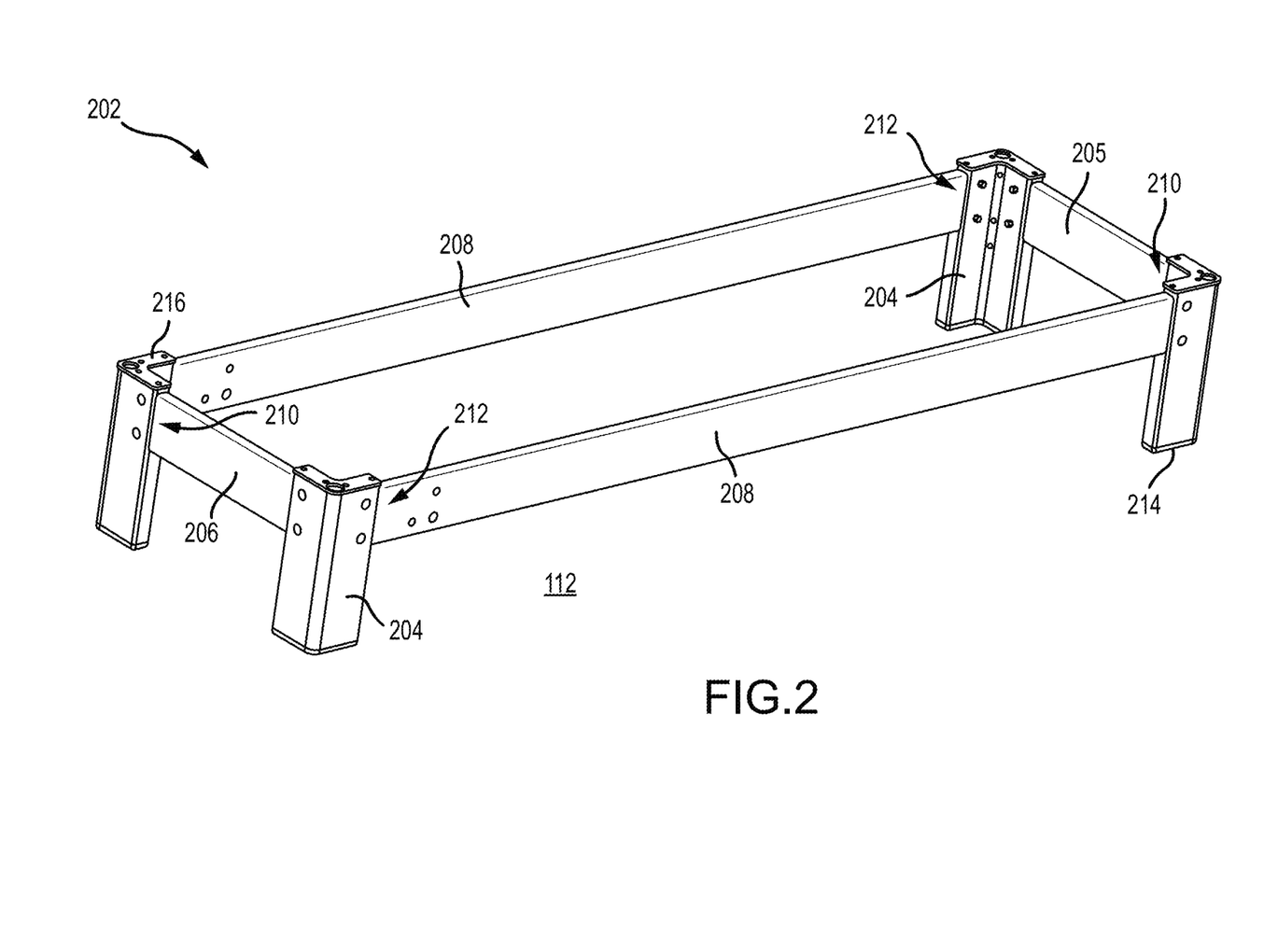
FIG. 2 is a perspective view of a reformer frame in accordance with one embodiment of the present disclosure for a reformer exercise apparatus.

FIG. 2 is a separate perspective view of a reformer frame 202 in accordance with one exemplary embodiment of the present disclosure. The frame 202 includes four corner members 204 each having a longitudinal axis 336. The frame 202 has a head end member 205 at one end of the frame 202 and a foot end member 206 at an opposite end of the frame 202. The frame 202 also includes two side members 208. Each of the head and foot end members 205 and 206 has opposite ends 210. Similarly, each side member 208 has opposite ends 212.

Ends 210 of the head end member 205 are each coupled to a corner member 204 in the embodiment shown in FIG. 2. Similarly, the ends 210 of the foot end member 206 are each coupled to another corner member 204. The head and foot end members 205 and 206 are coupled to side member ends 212 of the side members 208 by way of the corner members 204 instead of being coupled directly to one another (e.g., as they are in the conventional reformer 100 shown in FIG. 1).

The bottom ends of the corner members 204 each contact a typically flat surface, such as a floor 112, thereby providing structural support for and elevating the rectangular portion of the frame 202 above the floor 112. It is to be understood however, that should the floor 112 not be level, the length of each of the corner members 204 may be selected so as to compensate, i.e., position the upper rectangular shape of the frame 202 either level or at an angle of inclination desired by a user. For purposes of this disclosure, the floor 112 is assumed to be appropriately level.

Figure 3:
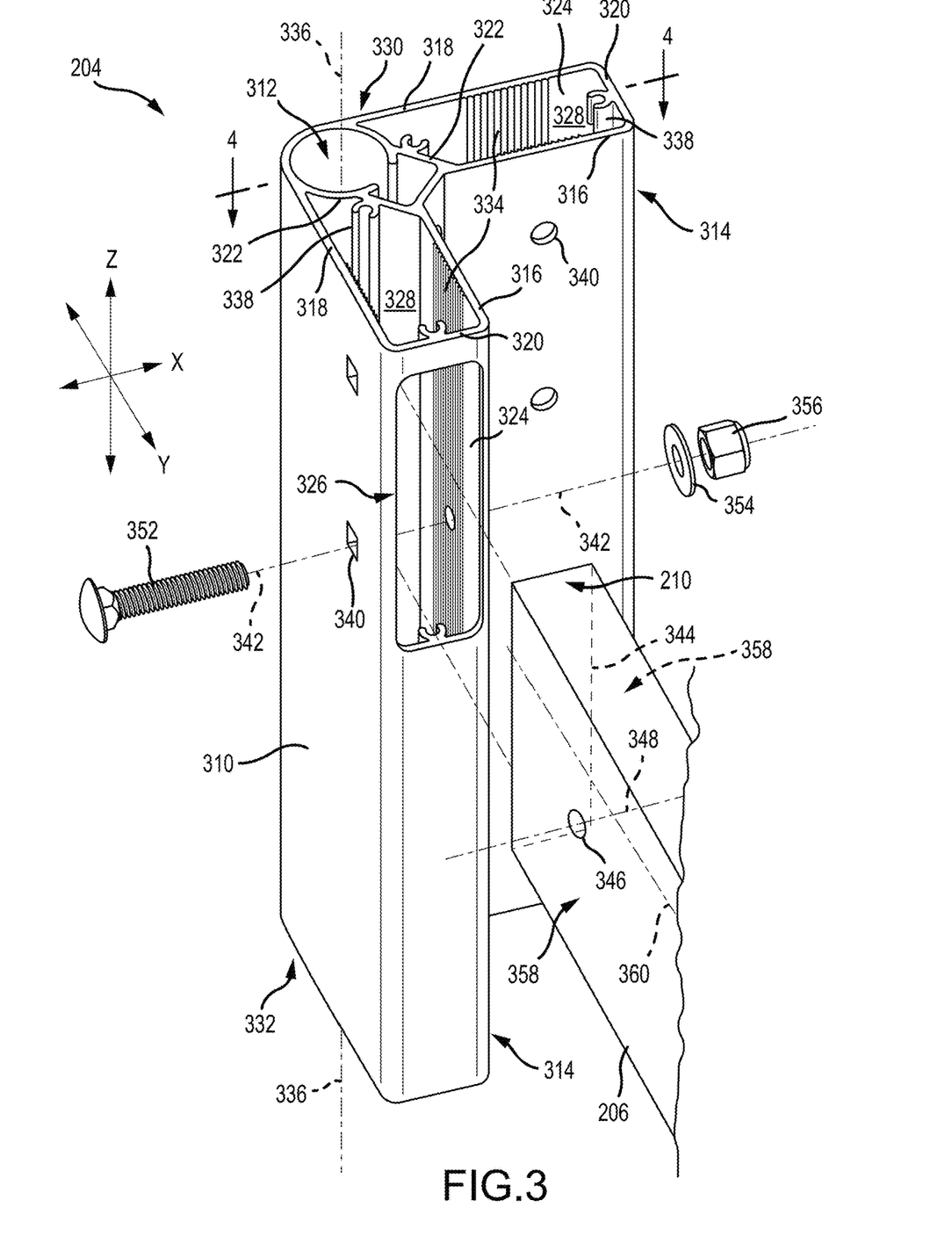
FIG. 3 is a separate exploded perspective view of one of the corner members of the frame shown in FIG. 2 in accordance with the present disclosure.
Figure 4:
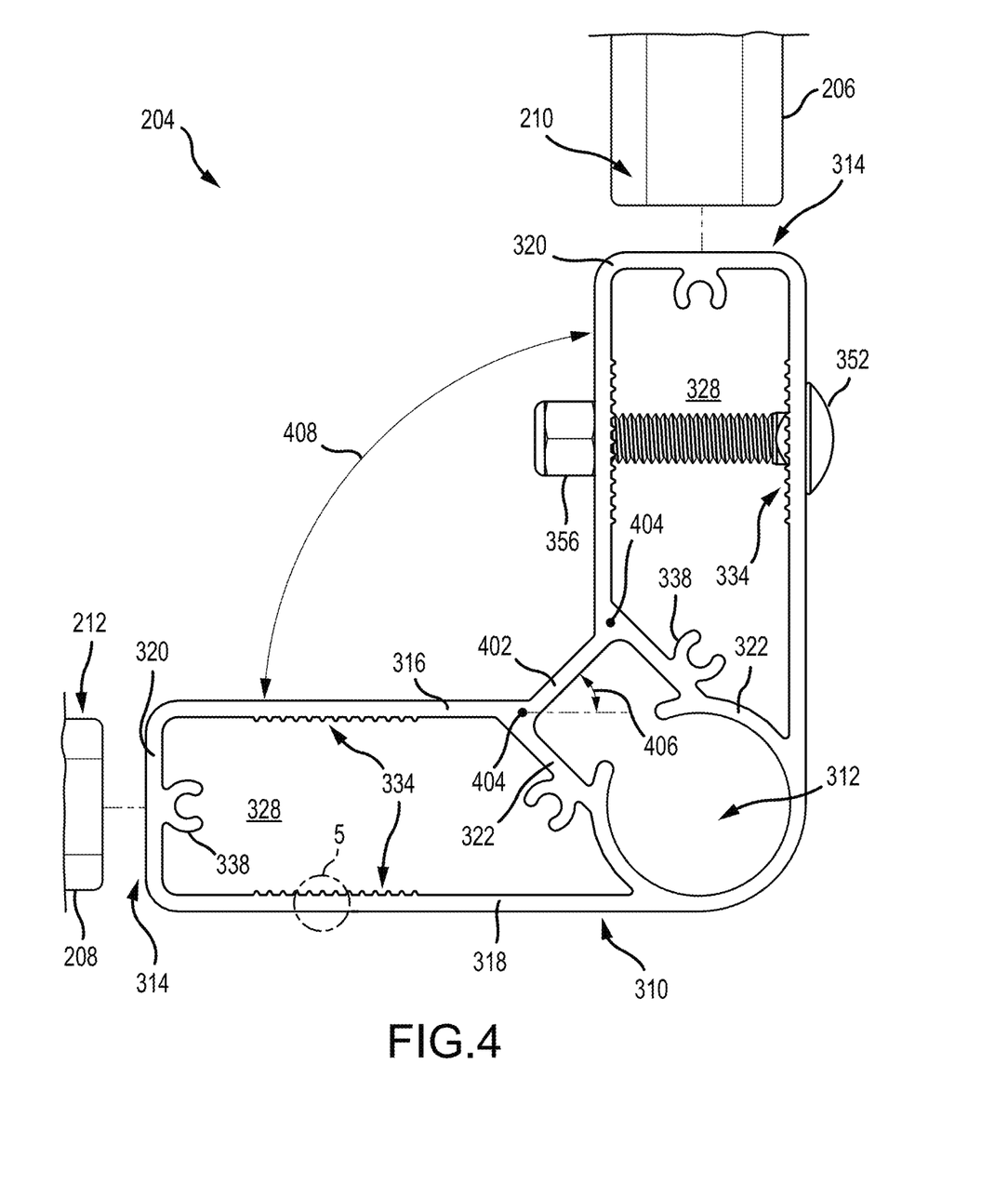
FIG. 4 is a top plan view of the corner member shown in FIG. 3 with side and end members ready for insertion into the corner member.

FIG. 3 is a separate exploded perspective view of a corner member 204 used in the frame 202. FIG. 4 is a plan view of the corner member 204. The corner member 204 is preferably an elongated, hollow, metal extrusion 310, preferably an extrusion made of aluminum or an aluminum alloy. The metal extrusion 310 includes a central corner portion 312. The metal extrusion 310 also includes two leg portions 314 extending from the central corner portion 312 at a right angle therebetween.

Each leg portion 314 of the metal extrusion 310 includes an inner side wall 316 and an outer side wall 318. In the embodiment shown in FIGS. 3 and 4, the inner side wall 316 is spaced from the outer side wall 318. The outer side wall 318 is parallel to the inner side wall 316. The inner side wall 316 and the outer side wall 318 merge with the corner portion 312.

An outer part of this corner portion 312 has a circular tubular cross section such that outer side wall 318 of each leg portion 314 tangentially merges with the corner portion 312. Each leg portion 314 of the metal extrusion 310 also includes an outer end wall 320 joining the inner side wall 316 and the outer side wall 318. The outer end wall 320 of each leg portion 314 is positioned distal the corner portion 312. Each of the two leg portions 314 of the metal extrusion 310 includes a corner wall 322 joining the inner side wall 316 and the outer side wall 318. The corner wall 322 of each leg portion 314 forms an inner part of the central corner portion 312. The corner wall 322 has a straight portion and a curved portion forming the circular tubular portion of corner portion 312. The corner wall 322 provides additional structural support to the corner member 204 metal extrusion 310 during, for example, use and/or storage of the frame 202.

The inner side wall 316 and the outer side wall 318 of each leg portion 314 have inner surfaces 324 facing the other side wall (316, 318). The metal extrusion 310 also includes an opening 326 defined through the outer end wall 320. The opening 326 defines a space 328 between the inner side wall 316 and the outer side wall 318 near the upper end 330 of the extrusion 310.

As shown in FIG. 3, at least one of the inner surfaces 324 of at least one of the two leg portions 314 includes discrete surface features 334. In the illustrated embodiment, both of the inner surfaces 324 of both leg portions 314 include the discrete surface features 334. The surface features 334 are preferably formed into the metal extrusion 310 integrally and contemporaneously with as part of the extrusion process used for manufacturing the corner member 204. As such, the surface features 334 extend along the entire length (e.g., between the upper extrusion end 330 and bottom lower extrusion end 332 preferably parallel to a longitudinal axis 336 of the metal extrusion 310. In an alternative embodiment (not shown), the surface features 334 are not integrally formed during the extrusion process, but rather may be formed in and/or placed upon at least a portion of the inner surface(s) 324 after the metal extrusion 310 is manufactured. In such other embodiments, the surface features 334 either extend along the entire length of the metal extrusion 310 inner surface(s) 324 or they are present only along a portion or along portions of that length.

The metal extrusion 310 preferably includes at least one screw race 338 typically for engaging fasteners to attach a separate cap 214, 216 or other separate element. In the extrusion process for manufacturing the corner member 204 metal extrusion 310, at least one screw race 338 may be formed in at least one of the corner wall 322, the outer end wall 320, the inner side wall 316, the outer side wall 318, and the corner portion 312 of at least one of the two leg portions 314. The screw race(s) 338 may extend along the entire length of the metal extrusion 310. The screw race(s) 338 formed in the interior of the metal extrusion 310 of the corner member 204 and are thus not externally visible when the frame 202 is assembled and caps 214 and 216 are installed.

At least one of the two leg portions 314 of the metal extrusion 310 includes at least one pair of holes 340 (preferably two pairs of holes 340) defined through the inner and outer side walls 316 and 318. Each of the two holes 340 of the pair of holes 340 is aligned cross-wise across the respective leg portion 314 along a transverse axis 342. The transverse axis 342 is parallel to an x-axis and is also perpendicular to both a y-axis and a z-axis of the metal extrusion 310, as shown in FIG. 3. Thus, each of the two holes 340 of the pair of holes 340 is preferably positioned equidistant from both of the first and second ends 330 and 332, as well as from the outer end wall 320 of the respective leg portion 314 through which the two holes 340 are defined.

The opening 326 in the illustrated embodiment is sized and shaped for receiving one end (210, 212) of one of the side members 208 and end members (205, 206) in the space 328 between the side walls 316 and 318 of the metal extrusion 310. Preferably, the opening 326 is sized to substantially match a cross-sectional area 344 of the one end (210, 212) of one of the side members 208 and end members (205 and/or 206). Dimensionally matching the one end (210, 212) and the opening 326 in this manner facilitates a tight fit of the one end (210, 212) into the metal extrusion 310 in preparation for further assembly steps of the frame 202. The end member end(s) 210 and/or the side member end(s) 212 each preferably include a through-hole 346 predrilled through the end(s) (210, 212). In the illustrated embodiment, the through-hole 346 is bored through the member (e.g., the side member 208) along a center line 348.

During assembly of the frame 202, end member 210 and/or side member 212 ends are inserted into the opening(s) 326 of the metal extrusion 310 and may be butted up against wall 322. The at least one pair of holes 340 are adapted to receive a fastener 352 therethrough to fasten the one end (210, 212) of one of the side members 208 and end members (205, 206) in the space 328. In the illustrated embodiment, the holes 340 bored through the outer side wall 318 are square-shaped to accommodate the heads of carriage bolt-type fastener(s) 352.

The member end(s) (210 and/or 212) are inserted into the space(s) 328 through the opening(s) 326 to the extent that the center line(s) 348 are axially aligned with the transverse axes 342. Next, fastener(s) 352 are inserted and received into and through the pair of holes 340 and the through-hole 346. In the illustrated embodiment, a threaded end of the fastener 352 is first inserted into the hole 340 defined through the outer side wall 318, the fastener 352 is inserted further into the through-hole 346, and the threaded end of the fastener 352 exits from the hole 340 defined through the inner side wall 316. A washer 354 is next fitted over the threaded end of the fastener 352, and then a nut 356 is threaded onto the threaded end of the inserted fastener 352 and tightened, thus fastening and securing the member end(s) (210 and/or 212) inserted through the opening(s) 326 into the space(s) 328.

The surface features 334 of the metal extrusion 310 grip and retain the end(s) (210, 212) inserted into the space(s) 328 when received through the opening(s) 326, and when inner side wall 316 and the outer side wall 318 are squeezed together. The surface features 334 present on one or more of the inner surface(s) 324 of the leg portion(s) 314 contact with the side surfaces 358 of the end(s) (210, 212) upon their being inserted into the space(s) 328 through the opening(s) 326. Tightening of the nut 356 draws at least a portion of the inner side wall 316 and at least a portion of the outer side wall 318 toward one another, thereby applying a clamping-like distributed force against the side surfaces 358 of the end(s) (210, 212) to securely retain the ends in the corner member 204. This clamping action facilitates a close contact and/or distributed surface engagement, or bite, between the surface features 334 and the side surfaces 358 of inserted end(s) (210, 212). The resulting clamped contact between the end(s) (210, 212) and the surface features 334 resists a tendency of the end(s) (210, 212) to rotate under torque relative to the corner member(s) 204 in the assembled frame 202.

Referring again to FIG. 4, the central corner portion 312 of the metal extrusion 310 also includes an inner connecting wall 402. In the illustrated embodiment, each of the two leg portions 314 includes an intersection point 404 between the inner side wall 316 and the corner wall 322. The connecting wall 402 joins the two inner side walls 316 of the metal extrusion 310 and extends between the two intersection points 404 thereof. The connecting wall 402 provides additional structural support to the corner member 204 metal extrusion 310. Also, as shown in FIG. 4, the connecting wall 402 extends between the two intersection points 404 at an angle 406 of about forty-five degrees (45°) with respect to the inner side wall 316.

Figure 5:
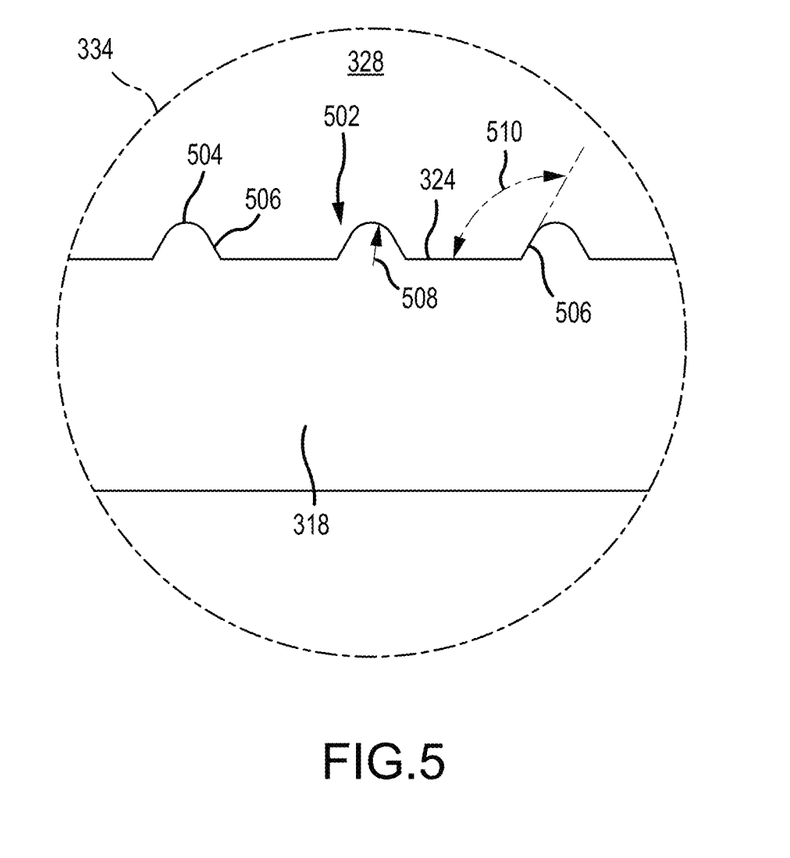
FIG. 5 is an enlarged partial plan view of the circled part shown in FIG. 4 of the outer side wall of the corner member to show the surface features.

FIG. 5 is an enlarged partial plan view of a portion of the outer side wall 318 having the surface features 334 and denoted as "5" in FIG. 4. The exemplary surface features 334 include a plurality of longitudinal ribs 502 extending parallel to the longitudinal axis 336 along inner surface(s) 324 of the inner and outer side walls (316, 318) adjacent the opening 326 through the outer end wall 320. These ribs 502 may extend fully along the length of each of the leg portions 314 parallel to the axis 336. These ribs 502 are formed during the process of extruding the corner member 204 metal extrusion 310. Also, as described above in relation to FIG. 3 with respect to the surface features 334 generally, the ribs 502 extend or project into the space(s) 328 away from the inner surface(s) 324. A distance by which the ribs 502 extend away from the inner surface(s) 324 is predetermined prior to extruding the corner member 204 metal extrusion 310. In the illustrated embodiment, each of the plurality of ribs 502 extends away from the inner surface(s) 324 into the space(s) 328 to substantially equal distances. Alternatively, at least one of the plurality of ribs 502 may extend into the space(s) 328 to a different distance from the inner surface(s) 324 as compared to at least one other rib 502. Each of the plurality of ribs 502 includes a tip 504. In the illustrated exemplary embodiment, the tip 504 is rounded to a predetermined radius 508. An arc defined by the rounded tip 504 is tangent to two rib sides 506. In the illustrated embodiment, the two rib sides 506 of each of the plurality of ribs 502 form an angle 510 of about one-hundred-twenty degrees (120°) with respect to the inner surface(s) 324. These ribs 502 may alternatively have a saw tooth profile rather than a symmetrical sided profile as shown.

Figure 6:
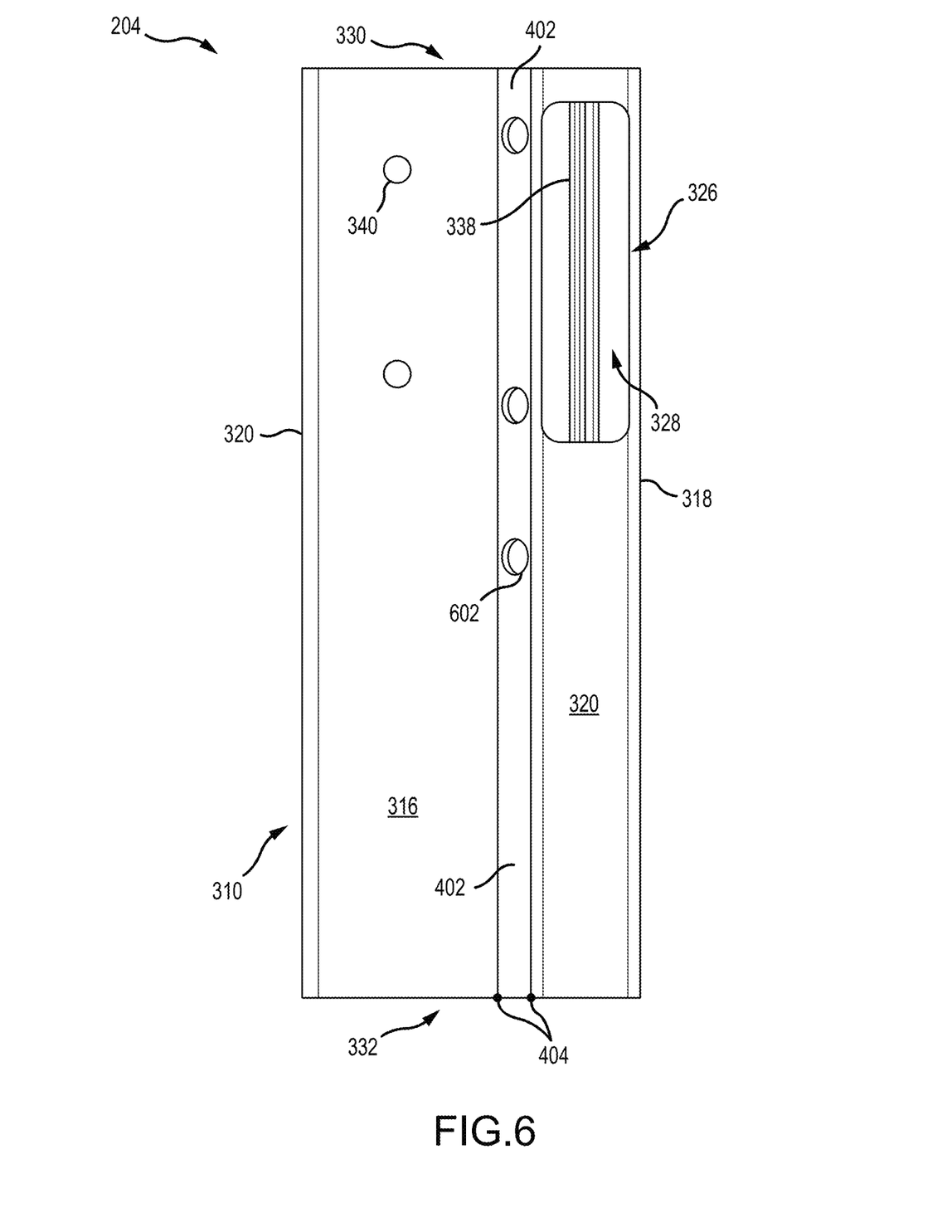
FIG. 6 is a side view of the corner member shown in FIGS. 3 and 4.

FIG. 6 is a side view of the corner member 204 shown in FIGS. 3 and 4. In the illustrated embodiment, the metal extrusion 310 includes one or more connecting wall holes 602 defined through the inner connecting wall 402. The at least one connecting wall hole 602 also defines a portal through the connecting wall 402 from an exterior of the metal extrusion 310 into the interior of the metal extrusion 310. One or more components (e.g., other than those described above with reference to the frame 202) may be fastened to, hooked upon, inserted into and/or otherwise affixed to the connecting wall hole(s) 602 of one or more of the corner member 204 metal extrusions 310, such as an arm cord riser (not shown) or other accessory attachment. The vertically spaced connecting wall holes 602 may be utilized to fasten an attachment such as an arm cord riser in place. In this case, the bottom hole 602 receives a screw that acts as a bottom stop for the riser tube. The upper holes may be threaded to each receive a set screw to hold the riser in place.

The above-described embodiments present only exemplary variations. Accordingly, all such alternatives, variations and modifications are intended to be encompassed within the scope or and as defined by the following claims. Referring again to FIGS. 3-6, in one alternative embodiment (not shown), one or both leg portions 314 of the metal extrusion 310 does not include the corner wall 322. In another embodiment (not shown), the opening 326 (shown in FIGS. 3 and 6) is defined (e.g. cut) through a portion of the outer end wall 320 proximate the second extrusion end 332, and the space 328 is thereby defined adjacent the second end 332. In yet another embodiment (not shown), the metal extrusion 310 (shown in FIGS. 3 and 6) includes at least two openings 326. In such other embodiments, for example, a first opening 326 is cut through a portion of the outer end wall 320 proximate the first end 330 and a second opening 326 is cut through a portion of the outer end wall 320 proximate the second end 332, with first and second spaces 328 thereby defined adjacent the first 330 and second 332 ends, respectively.

Although it is described herein as including a "metal" extrusion 310, corner member 204 may be formed of a variety of materials besides, or in addition to, metals. For example, and without limitation, corner member 204 may be formed of materials of construction including plastic, wood, carbon-fiber, graphite, rock, stone, cement, and composite materials. Some of these other materials may not be amendable to extrusion-based processes and may instead require such manufacturing processes as cutting, molding, pressing, bending, and additive manufacturing, either instead of or in addition to extrusion methods. Such alternative processes for manufacturing of the corner member 204 will be appreciated by persons having skill in the art.

In another embodiment (not shown), the cap 216 and/or base 214 piece(s) may be fastened to the first 330 and/or second 332 extrusion ends using non-threaded fastener(s) other than screws, bolts, and similar threaded fasteners. In such other embodiments, the screw race(s) 338 may not develop threads. In yet another embodiment (not shown), the holes 340 defined (e.g., bored) through the outer side wall 318 are instead circularly-shaped and the fasteners 352 are standard bolts rather than carriage bolt-type fasteners 352. In still another embodiment (not shown), the threaded end of the fastener 352 is first inserted into the hole 340 bored through the inner side wall 316, the fastener 352 is inserted further into the through-hole 346 toward the outer side wall 318, and the threaded end of the fastener 352 exits from the hole 340 bored through the outer side wall 318.

In another embodiment (not shown), the securement of the member(s) (205, 206, 208) does not make use of the washer 354. In yet another embodiment (not shown), assembly of the frame 202 may not include use of the fastener 352 and/or the nut 356. In such other embodiments, the surface features 334 may be sized and shaped to extend or project by a predetermined distance into the space(s) 328 such that they impinge and/or inhibit a free passage of the end(s) (210, 212) into and out of the space(s) 328 through the opening(s) 326. In such other embodiments, insertion of the end(s) (210, 212) into the space(s) 328 through the opening(s) 326 may require a force to be applied (e.g., directed generally along a long axis 360 toward the corner portion 312) during assembly of the frame 202. Such an applied force may be required to effect movement of the ends (210, 212) through the opening(s) 326 and into the space(s) 328 despite the ends (210, 212) contacting the surface features 334.

In other embodiments (not shown), the metal extrusion 310 may not include the inner connecting wall 402. In such other embodiments, the two corner walls 322 of the metal extrusion 310 join the two inner side walls 316 at a single intersection point 404. In still other embodiments (not shown), the connecting wall 402 extends between the two intersection points 404 at an angle with respect to the inner side wall 316 that is greater than zero degrees (0°) and less than forty-five degrees (45°) angle. In yet another embodiment (not shown), the connecting wall 402 extends between the two intersection points 404 at an angle with respect to the inner side wall 316 that is greater than 45° and less than ninety degrees (90°).

In an alternative embodiment (not shown), each of the two rib sides 506 may be oriented at right angles 510 with respect to the inner surface(s) 324. In yet another embodiment (not shown), each of the two rib sides 506 are oriented at angles 510 with respect to the inner surface(s) 324 that are greater than 90° and less than 180°. In still other embodiments (not shown), each of the two rib sides 506 may be oriented at angles 510 with respect to the inner surface(s) 324 that are greater than 0° and less than 90°. In some embodiments (not shown), the angle 510 that a first rib side 506 makes with respect to the inner surface 324 may not be equal to the angle 510 made by a second rib side 506 with respect to the inner surface 324. Moreover, in an alternative embodiment (not shown), the tip(s) 504 of one or more of the plurality of ribs 502 is not rounded, but rather forms a point (e.g., an apex) defined by the intersection of the two rib sides 506. In another embodiment (not shown), the tip(s) 504 of one or more of the plurality of ribs 502 are substantially flat and thus define a plane extending along the length of the rib 502.

The corner member 204 is formed in an L-shape with the two leg portions 314 oriented at a right angle 408. Each of the two leg portions 314 extends away from the corner portion 312 by the same distance and the two leg portions 314 also have equivalent widths (e.g., a distance between the parallel inner 316 and outer 318 side walls). The embodiment shown in FIG. 4 is thus symmetrical along each of the x, y, and z-axes shown in FIG. 3. In an alternative embodiment (not shown), the corner member 204 metal extrusion 310 is not symmetrically formed with respect to at least one of the x, y, and z-axes. In one such other embodiment (not shown), a first of the two leg portions 314 extends away from the corner portion 312 by a distance that is not equal to the distance by which a second of the two leg portions 314 extends away from the corner portion 312. In another embodiment (not shown), the width of the first of the two leg portions 314 is not equal to the width of the second of the two leg portions 314.

In another embodiment (not shown), the frame 202 (shown in FIG. 2) is not rectangular. In these embodiments, the corner member 204 metal extrusion 310 is not L-shaped and the two leg portions 314 are not oriented with respect to one another at a right angle 408. In one such embodiment, the two leg portions 314 are oriented at an angle 408 of greater than 0° and less than 90°. In another such embodiment, the two leg portions 314 are oriented at an angle 408 of greater than 90° and less than one-hundred-eighty degrees (180°).

One having ordinary skill in the art will appreciate that, in either of the cases where the corner member 204 is symmetrically formed with respect to each of the x, y, and z-axes, or where the corner member 204 metal extrusion 310 is not symmetrically formed with respect to at least one of the x, y, and z-axes, the general assembly steps for the frame 202, and the principals of operation and benefits thereof remain substantially the same. Likewise, one having ordinary skill in the art will also appreciate that, in either of the cases where the frame 202 is rectangular or where the frame 202 takes on a different shape including, for example, a polygonal shape not having four sides, the assembly of, and the principals of operation and benefits of the frame 202 and its constituent parts remain substantially the same as described herein.

Manufacturers, vendors, users, and other entities benefit from the inclusion of surface features 334 on at least one of the inner surfaces 324 of at least one of the two leg portions 314 of the corner member 204 metal extrusion 310. As compared to the known frame 102 shown in FIG. 1, the surface features 334 facilitate longer operating lifetimes of the frame 202 by mitigating loosening of contact points between the end(s) (210, 212) and the corner member(s) 204. In frame 202 embodiments including fastener(s) 352, washer(s) 354 and/or nut(s) 356, the surface features 334 also mitigate loosening of these and like fastening components during use and storage of the frame 202. Furthermore, by reducing the tendency of the end(s) (210, 212) to rotate under torque relative to the corner member(s) 204 in the assembled frame 202, the surface features 334 facilitate reducing wear of the ends (210, 212) and/or the corner member 204 metal extrusion(s) 310. The above advantages flowing from the inclusion of surface features 334 on at least one of the inner surfaces 324 of at least one of the two leg portions 314 of the metal extrusion 310 thus provide a longer operating lifetime to the frame 202, along with reduced maintenance times and costs relative to the known frame 102 shown in FIG. 1. Additional benefits of including surface features 334 on at least one of the inner surfaces 324 of at least one of the two leg portions 314 of the corner member 204 metal extrusion 310 shall be recognizable to persons of skill in the art in a multitude of applications which are not limited to the particular embodiments discussed herein.

Referring again to FIG. 2, each of the corner members 204 of the frame 202 preferably includes an L shaped base piece 214 coupled to and/or fitted into or upon an end of the corner member 204 which contacts, for example, the floor 112. Base piece 214 may be formed in substantially the same size and shape as a cross-sectional shape of the corner member 204, as shown in FIG. 4. Base piece 214 may also be formed of a material of construction that is softer, more elastic and/or more pliable than a rigid material of construction of the corner member 204. Users of frame 202 embodiments having the base piece(s) 214 may thereby benefit by mitigating wear of the corner member(s) 204 and/or the floor 112 which may result from corner members 204 contacting the floor 112. Users of frame 202 embodiments having the base piece(s) 214 may also benefit from being able to accommodate the frame 202 to surfaces such as the floor 112 that are not entirely flat. For example, at least one, but less than four base piece(s) 214 included in the frame 202 may have a different thickness so as to mitigate wobbling of the frame 202 placed upon an uneven floor 112 that is not entirely flat (e.g., placing the frame 202 partially upon a carpeted portion of the floor 112 and partially upon an uncarpeted portion of the floor 112). Base pieces 214 may also have varying sizes (e.g., base piece 214 lengths relative to lengths of the corner members 204) in embodiments of the frame 202 having corner members 204. Users of frame 202 embodiments having base pieces 214 having varying lengths may benefit in like manner to the examples discussed above, such accommodating the frame 202 to a floor 112 that is not entirely flat.

One or more of the corner members 204 of the frame 202 may also include a cap piece 216 coupled to and/or fitted into or upon an upper end of the corner member 204 which does not contact, for example, the floor 112 (e.g., the end that is distal the floor 112). Cap piece 216 may be formed in substantially the same size and shape as a cross-sectional shape of the corner member 204, as shown in FIG. 4. Cap piece 216 may also be formed of a material of construction that is softer, more elastic and/or more pliable than a material of construction of the corner member 204. Users of frame 202 embodiments having the cap piece(s) 216 may benefit in a variety of ways. Some users may desire to store the frame 202 leaned upright against a wall (not shown) and cap piece(s) 216 may mitigate wear upon the wall for frame(s) 202 stored in this manner. For example, cap piece(s) 216 may also present a pleasing visual appearance of the frame 202 to the user. Cap piece(s) 216 having, for instance, differing colors, may also facilitate identification of two or more frames 202 by one or more users. Also, cap piece(s) 216 included in the frame 202 may prevent or mitigate discomfort or injury to the user of frame 202 by, for example, providing a rounded, softer and/or brighter color as compared to a background color (e.g., glow-in-the-dark). Such embodiments of frame 202 having cap piece(s) 216 having characteristics such of those described above facilitate users' ability to identify, locate and/or safely and comfortably enjoy the frame 202 during activities attendant to, for example, exercising on a reformer incorporating the frame 202. The cap pieces 216 preferably may include features such as recesses or protrusions configured to engage corresponding features on the bottom pieces 214 so as to facilitate stacking of one reformer frame 202 atop another reformer frame 202.

Manufacturers, vendors, users, and other entities benefit from the inclusion of corner members 204 in the frame 202 in a variety of tangible ways. Corner members 204 may enable more modular design and assembly methods to be employed for frames 202 as compared to known frames 102 (e.g., as included in the known reformer 100 shown in FIG. 1). Corner members 204 included in frames 202 may also facilitate as-needed replacement and/or exchange of component parts of frame 202 with lower time and cost as compared to known frames 102. Still more benefits shall be recognizable to persons of skill in the art in a multitude of applications which are not limited to the particular embodiments discussed herein.

One of ordinary skill in the art will recognize and appreciate that the surface features 334 may be formed in a variety of ways and in a variety of shapes and sizes beside the ribs 502 shown in FIG. 5. For example, and without limitation, the surface features 334 may be formed as a plurality of raised bumps and/or ridges projecting away from the inner surfaces 324 into the space(s) 328. Also, for instance, the surface features 334 may include pyramidal, polygonal, conical, frusto-conical, cylindrical, rectangular, and/or other cubic projections extending away from the inner surfaces 324 into the space(s) 328. The corner member 204 metal extrusion 310 inner surface(s) 324 may therefore include surface features 334 including any combination of any number of one or a plurality of surface feature(s) 334 having shapes and sizes to facilitate accomplishing the several benefits as described herein, and still other benefits recognizable to one of skill in the art in a multitude of applications other than as related to particular embodiments discussed herein.

What is claimed is:

1. A reformer exercise apparatus comprising:
a rectangular frame having a head end member, a foot end member and a pair of spaced parallel side members; and
a corner member joining at least each side member to one of the head and foot end members, the corner member comprising:
a single elongated hollow metal extrusion having, in cross section, a central corner portion and two leg portions each extending from the central corner portion at a right angle to the other leg portion,
each leg portion having an inner side wall spaced from an outer side wall parallel to the inner side wall and merging with the central corner portion, and an outer end wall joining the inner and outer side walls;
the inner and outer side walls each having an inner surface facing the inner surface of the other side wall, and a rectangular opening through the outer end wall defining a space between the inner and outer side walls adjacent one end of the extrusion for receiving one end of one of the frame side members and end members;
wherein at least one of the inner surfaces of the side walls in the space has discrete rigid surface features adapted to grip and retain the one end of one of the side members and end members in the space when received through the opening; and
wherein the central corner portion has a circular cross section portion tangent to each outer side wall and a straight inner connecting wall joining the inner side wall of each leg portion.

2. The reformer exercise apparatus of claim 1, wherein at least one of the two leg portions has at least one pair of holes defined through the inner and outer side walls.

3. The reformer exercise apparatus of claim 2, wherein the at least one pair of holes are adapted to receive a fastener therethrough to fasten the one end of one of the side members and end members in the space.

4. The reformer exercise apparatus of claim 1, wherein the surface features include a plurality of ribs extending across the opening.

5. The reformer exercise apparatus of claim 1, wherein each leg portion further includes a corner wall joining the inner and outer side walls.

6. The reformer exercise apparatus of claim 5, wherein at least one of the corner wall, the outer end wall, the inner side wall, and the outer side wall includes a screw race.

7. A reformer frame having four corner members each joining a side member to one of a head end member and a foot end member, each corner member comprising:
 a single elongated hollow metal extrusion having an axis and, in cross section, a central corner portion and two leg portions each extending from the central portion at a right angle to the other leg portion,
 each leg portion having an inner side wall spaced from an outer side wall parallel to the inner side wall and merging with the central portion, and an outer end wall joining the inner and outer side walls;
 the inner and outer side walls each having an inner surface facing the inner surface of the other side wall, and a rectangular opening through the outer end wall defining a space between the inner and outer side walls adjacent one end of the extrusion for receiving one end of one of the side members and end members;
 wherein at least one of the inner surfaces of the side walls in the space has discrete rigid surface features adapted to engage the one end of one of the side members and end members in the space when received through the opening; and
 wherein the central corner portion has a circular cross section portion tangent to each outer side wall and a straight inner connecting wall joining the inner side wall of each leg portion.

8. The reformer frame of claim 7, wherein at least one of the two leg portions has at least one pair of holes defined through the inner and outer side walls.

9. The reformer frame of claim 8, wherein the at least one pair of holes are adapted to receive a fastener therethrough to fasten the one end of one of the side members and end members in the space.

10. The reformer frame of claim 7, wherein the surface features include a plurality of ribs extending along the inner surface of at least one of the inner wall or the outer wall.

11. The reformer frame of claim 7, wherein each leg portion further includes a corner wall joining the inner and outer side walls.

12. The reformer frame of claim 11, wherein at least one of the corner wall, the outer end wall, the inner side wall, and the outer side wall includes a screw race.

13. The reformer frame according to claim 7 wherein the surface features are on each of the inner surfaces of the inner wall and the outer wall.

14. The reformer frame according to claim 10 wherein the ribs extend along the surface parallel to the extrusion axis.

* * * * *